United States Patent
Pelzer et al.

(10) Patent No.: US 12,449,424 B2
(45) Date of Patent: Oct. 21, 2025

(54) IN VITRO METHOD FOR DETECTING AVIAN INTESTINAL DYSBIOSIS

(71) Applicant: EVONIK OPERATIONS GMBH, Essen (DE)

(72) Inventors: Stefan Pelzer, Gütersloh (DE); Monika Flügel, Steinhagen (DE); Sarah Hark, Gütersloh (DE); Evy Goossens, Wachtebeke (BE); Filip Van Immerseel, Eke (BE); Richard Ducatelle, Wortegem-Petegem (DE); Lieven Van Meulebroek, Zottegem (BE); Lynn Vanhaecke, Balegem (BE)

(73) Assignee: Evonik Operations GmbH, Essen (DE)

( * ) Notice: Subject to any disclaimer, the term of this patent is extended or adjusted under 35 U.S.C. 154(b) by 1161 days.

(21) Appl. No.: 17/413,548

(22) PCT Filed: Dec. 9, 2019

(86) PCT No.: PCT/EP2019/084170
§ 371 (c)(1),
(2) Date: Jun. 12, 2021

(87) PCT Pub. No.: WO2020/120376
PCT Pub. Date: Jun. 18, 2020

(65) Prior Publication Data
US 2022/0050115 A1 Feb. 17, 2022

(30) Foreign Application Priority Data
Dec. 14, 2018 (EP) ................... 18212599

(51) Int. Cl.
*G01N 33/68* (2006.01)
*G01N 30/72* (2006.01)

(52) U.S. Cl.
CPC ..... *G01N 33/6848* (2013.01); *G01N 30/7233* (2013.01); *G01N 33/6893* (2013.01); *G01N 2800/06* (2013.01); *G01N 2800/52* (2013.01)

(58) Field of Classification Search
CPC ........... G01N 33/6848; G01N 30/7233; G01N 33/6893; G01N 2800/06; G01N 2800/52
See application file for complete search history.

(56) References Cited

U.S. PATENT DOCUMENTS

| | | |
|---|---|---|
| 5,094,956 A | 3/1992 | Grow |
| 5,538,851 A | 7/1996 | Fach et al. |
| 5,874,220 A | 2/1999 | Fach et al. |
| 6,812,023 B1 | 11/2004 | Lamparski et al. |
| 6,899,863 B1 | 5/2005 | Dhellin et al. |
| 7,198,923 B1 | 4/2007 | Abrignani et al. |
| 7,374,927 B2 | 5/2008 | Palma et al. |
| 8,263,088 B2 | 9/2012 | Moore et al. |
| 8,673,560 B2 | 3/2014 | Leamon et al. |
| 11,643,696 B2 | 5/2023 | Flügel et al. |
| 12,031,991 B2 | 7/2024 | Flügel et al. |
| 2002/0048576 A1 | 4/2002 | Anderson et al. |
| 2003/0050470 A1 | 3/2003 | An et al. |
| 2004/0101860 A1 | 5/2004 | Jones et al. |
| 2007/0042354 A1 | 2/2007 | Engelhard et al. |
| 2010/0291131 A1 | 11/2010 | Moore et al. |
| 2011/0117540 A1 | 5/2011 | Cary |
| 2012/0058904 A1 | 3/2012 | Shanks et al. |
| 2014/0099373 A1 | 4/2014 | Broomhead et al. |
| 2014/0178885 A1 | 6/2014 | Park et al. |
| 2014/0296134 A1* | 10/2014 | Savidge ........... G01N 33/56905 514/254.11 |
| 2016/0040119 A1 | 2/2016 | Hashman et al. |
| 2016/0041153 A1 | 2/2016 | Brown et al. |
| 2017/0108503 A1 | 4/2017 | Klass et al. |
| 2017/0340683 A1 | 11/2017 | Petri et al. |
| 2018/0312905 A1 | 11/2018 | Igwe et al. |
| 2020/0239938 A1 | 7/2020 | Kappel et al. |
| 2021/0003592 A1 | 1/2021 | Flügel et al. |
| 2021/0011027 A1 | 1/2021 | Flügel et al. |
| 2021/0139955 A1 | 5/2021 | Flügel et al. |
| 2021/0207193 A1 | 7/2021 | Thiemann et al. |
| 2021/0228653 A1 | 7/2021 | Petri et al. |

(Continued)

FOREIGN PATENT DOCUMENTS

| | | |
|---|---|---|
| CN | 102697812 | 10/2012 |
| CN | 104531867 | 4/2015 |

(Continued)

OTHER PUBLICATIONS

Skraban J, Dzeroski S, Zenko B, Tusar L, Rupnik M. (Aug. 30, 2013) "Changes of poultry faecal microbiota associated with Clostridium difficile colonisation" Veterinary microbiology, 165, 3-4, pp. 416-424. (Year: 2013).*

El-Hack et al. The relationship among avian influenza, gut microbiota and chicken immunity: an updated overview. Poultry Science. 2022;101(9):1-14.*

Roy et al. Antibiotic treatment triggers gut dysbiosis and modulates metabolism in a chicken model of gastro-intestinal infection. BMC Vet Res. 2019;15(1):1-13.*

(Continued)

*Primary Examiner* — Lynn Y Fan

(74) *Attorney, Agent, or Firm* — Law Office of: Michael A. Sanzo, LLC

(57) ABSTRACT

The invention pertains to an in vitro method for detecting avian intestinal dysbiosis, the method comprising determining the presence and/or level of isoleucyl-arginine ($C_{12}H_{25}O_3N_5$) or isomers thereof in avian sample material wherein the presence and/or an increased level of isoleucyl-arginine ($C_{12}H_{25}O_3N_5$) or isomers thereof in comparison to a non-affected control is indicative for avian intestinal dysbiosis.

17 Claims, No Drawings

(56) References Cited

U.S. PATENT DOCUMENTS

| | | |
|---|---|---|
| 2021/0262031 A1 | 8/2021 | Igwe et al. |
| 2022/0259642 A1 | 8/2022 | Dargatz et al. |
| 2023/0066330 A1 | 3/2023 | Raddatz et al. |

FOREIGN PATENT DOCUMENTS

| | | |
|---|---|---|
| CN | 107090518 | 8/2017 |
| EP | 0 281 251 | 9/1988 |
| EP | 2 495 025 A1 | 9/2012 |
| EP | 2 740 536 A2 | 6/2014 |
| JP | 2015-039320 | 3/2015 |
| KR | 2008-0082370 | 9/2008 |
| RU | 2472162 | 1/2013 |
| WO | WO 2005/016962 | 2/2005 |
| WO | WO 2005/122790 | 12/2005 |
| WO | WO 2008/148166 | 12/2008 |
| WO | WO 2012/017466 | 2/2012 |
| WO | WO 2014/012168 | 1/2014 |
| WO | WO 2014/107571 | 7/2014 |
| WO | WO 2015/103710 | 7/2015 |
| WO | WO 2016/011258 | 1/2016 |
| WO | WO 2016/201272 | 12/2016 |

OTHER PUBLICATIONS

Crisol-Martinez et al. A low dose of an organophosphate insecticide causes dysbiosis and sex-dependent responses in the intestinal microbiota of the Japanese quail . PeerJ. 2016;4(e2002):1-23.*
Apajalahti, et al., "Characteristics of the gastrointestinal microbial communities, with special reference to the chicken," World Poultry Journal 60:223-232 (Jun. 2014).
Borda-Molina, et al., "Insights into Broilers' Gut Microbiota Fed with Phosphorus, Calcium, and Phytase Supplemented Diets," Frontiers in Microbiology 7(2033):1-13 (Dec. 2016).
Borda-Molina, et al., "Current Perspectives of the Chicken Gastrointestinal Tract and Its Microbiome," Computational and Structural Biotechnology Journal 16:131-139 (Mar. 2018).
Cackle Hatchery (Coccidosis: the signs, symptoms and treatment), (2015).
Craven, et al., "Incidence and Tracking of Clostridium perfringens Through an Integrated Broiler Chicken Operation," Avian Diseases 47:707-711 (2003).
Danzeisen, et al., "Modulations of the Chicken Cecal Microbiome and Metagenome in Response to Anticoccidial and Growth Promoter Treatment," Plos One 6(11):e27949 (Nov. 2011).
Ding, et al., "Inheritance and Establishment of Gut Microbiota in Chickens," Frontiers in Microbiology 8(1967):1-11 (Oct. 2017).
Gaucher, et al., "Recurring Necrotic Enteritis Outbreaks in Commercial Broiler Chicken Flocks Strongly Influence Toxin Gen Carriage and Species Richness in the Resident Clostridium perfinges Population," Frontiers in Microbiology 8(881):1-11 (May 2017).
Gurjar, et al., "Real-time multiplex PCR assay for rapid detection and toxintyping of Clostridium perfinges toxin producing strains in feces of dairy cattle," Molecular and Cellular Probes 22:90-95 (Aug. 2007).
Hawrelak, et al., "The Causes of Intestinal Dysbiosis: A Review," Alternative Medicine Review 9(2):180-197 (2004).
Latorre, et al., "Evaluation of the Epithelial Barrier Function and Ileal Microbiome in an Established Necrotic Enteritis Challenge Model in Broiler Chickens," Frontiers in Veterinary Science 5(199):1-11 (Aug. 2018).
Lin, et al., "Disruption in the cecal microbiota of chickens challenged with Clostridium perfringens and other factors was alleviated by Bacillus licheniformis supplementation," Plos One 12:1-18 (Aug. 2017).
Lu, et al., "Diversity and Succession of the Intestinal Bacterial Community of the Maturing Broiler Chicken," Applied and Environmental Microbiology 69(11):6816-6824 (Nov. 2003).
Maki, et al., "Eggshell and environmental bacteria contribute to the intestinal microbiota of growing chickens," Journal of Animal Science and Biotechnology 11(60):1-17 (2020).
Naing, "Practial Issues in Calculating the Sample Size for Prevalence Studies," Archives of Orofacial Sciences 1:9-14 (2006).
Ngunjiri, et al., "Farm Stage, Bird Age, and Body Site Dominantly Affect the Quality, Taxonomic Composition, and Dynamics of Respiratory and Gut Microbiota of Commerical Layer Chickens," Applied and Environmental Microbiology 85(9):1-17 (May 2019).
Pandit, et al., "Microbial diversity and community composition of caecal microbiota in commercial and indigenous Indian chickens determined using 16s rDNA amplicon sequencing," Microbiome 6(115):1-13 (2018).
Sergeant, et al., "Extensive Microbial and Functional Diversity within the Chicken Cecal Microbiome," Plos One 9(3):e91941 (Mar. 2014).
Stanley, et al., "Highly Variable Microbiota Development in the Chicken Gastrointestinal Tract," Plos One 8(12):e84290 (Dec. 2013).
Stanley, et al., "Microbiota of the chicken gastrointestinal tract: influence on health, productivity and disease," Appl. Microbiol. Biotechnol. 98(10):4301-4310 (Mar. 2014).
Timbermont, et al., "Intra-species growth inhibition by Clostridium perfringens is a possible virulence trait in necrotic enteritis in broilers," Veterinary Microbiology 137(3-4): (2009).
Timbermont, et al., "Perfrin, a novel bacteriocin associated with netB positive Clostridium perfringens strains from broilers with necrotic enteritis," Veterinary Research 45(40):1-10 (2014).
Van Immerseel, et al., "Clostridium perfringens in poultry: an emerging threat for animal and public health," Avian Pathology 33(6):537-549 (Dec. 2004).
Walker, et al., "Fecal lactoferrin is a sensitive and specific marker of disease activity in children and young adults with inflammatory bowel disease," J. Pediatr. Gastroenterol. Nut. 44(4):414-422 (2007).
Wu, et al., "Effects of Bacillus coagulans supplementation on the growth performance and gut health of broiler chickens with Clostridium perfringens-induced necrotic enteritis," Journal of Animal Science and biotechnology 9(1):1-14 (Jan. 2018).
Yarza, et al., "Uniting the classification of cultured and uncultured bacteria and archaea using 16S rRNA gene sequences," Nature Reviews, Microbiology 12:635-645 (Sep. 2014).
Zhao, et al., "Quantitative Genetic Background of the Host Influences Gut Microbiomes in Chickens," Scientific Reports 3(1163):1-6 (2013).
Zou, et al., "Lactobacillus elicits a 'Marmite effect' on the chicken cecal microbiome," npj Biofilms and Microbiomes 2(27):1-5 (Nov. 2018).
U.S. Appl. No. 18/576,440, filed Jan. 4, 2024, Igwe.
International Search Report for corresponding application PCT/EP2019/084170, filed Dec. 9, 2019.
Written Opinion of the International Searching Authority for corresponding application PCT/EP2019/084170, filed Dec. 9, 2019.
International Preliminary Report on Patentability for corresponding application PCT/EP2019/084170, filed Dec. 9, 2019.
Partial European Search Report and Opinion for corresponding EP 18212599.7, filed Dec. 14, 2018.
Extended European Search Report and Opinion for corresponding EP 18212599.7, filed Dec. 14, 2018.
Agunos, et al., "A Systematic Review Characterizing On-Farm Sources of Campylobacter spp. For Broiler Chickens," Plos One 9(8):e104905 (Aug. 2014).
Dallal, et al., "Prevalence and antimicrobial resistance profiles of Salmonella serotypes, Campylobacter and Yersinia spp. Isolated from retail chicken and beef, Tehran, Iran," Food Control 21:388-392 (2010).
Devriese, et al., "Pseudomonas aeruginosa Infection on a Broiler Farm," Avian Pathology 4:233-237 (1975).
Ducatelle, et al., "Biomarkers for monitoring intestinal health in poultry: present status and future perspectives," Vet. Res. 49:1-9 (May 2018).
Santos, et al., "Pathobiology of Salmonella, intestinal microbiota, and the host innate immune response," Front. Immunol. 5:1-7 ((May 2014).
Wade, et al., "The true cost of necrotic enteritis," World Poultry 31:16-17 (2015).

(56) References Cited

OTHER PUBLICATIONS

Bailey, M., "The development and use of multiplex PCR protocols for the detection of *Clostridium perfringens* toxin encoding genes cpa, cpb, etx, ia, cpe, netB, and tpeL," Doctoral dissertation, Auburn University, (May 2013).

Merati, et al., "Identification and Characterization of *Clostridium perfringens* Isolated from Necrotic Enteritis in Broiler Chickens in Tiaret, Western Algeria," *Kafkas Univ Vet Fak Derg* 23(4)595-601 (Apr. 2017).

Nagpal, et al., Sensitive quantification of *Clostridium perfringens* in human feces by quantitative real-time PCR targeting alpha-toxin and enterotoxin genes, *BMC Microbiology* 15(1):1-12 (Oct. 2015).

Schlegel, et al., "Toxin-associated and other genes in *Clostridium perfringens* type A isolates from bovine clostridial abomasitis (BCA) and jejunal hemmorrhage syndrome (JHS)," *Canadian Journal of Veterinary Research* 76(4):248-254 (2012).

Singh, et al., "Molecular detection of *Clostridium perfringens* toxinotypes, Enteropathogenic *Escherichia coli*, rotavirus and coronavirus in diarrheic fecal samples of neonatal goat kids," *Veterinarski arhiv* 88(1):1-20 (2018).

Wu, et al., "Real-time PCR assay for *Clostridium perfringens* in broiler chickens in a challenge model of necrotic enteritis," *Applied and Environmental Microbiology* 77(3):1135-1139 (Feb. 2011).

Yadav, et al., "Molecular characterization and antimicrobial resistance profile of *Clostridium perfringens* type A isolates from humans, animals, fish and their environment," *Anaerobe* 47:120-124 (May 2017).

Yasugi, et al., "In vitro cytotoxicity induced by *Clostridium perfringens* isolate carrying a chromosomal cpe gene is exclusively dependent on sporulation and enterotoxin production," *Microbial Pathogenesis* 85:1-10 (Apr. 2015).

Akbarmehr, "Isolation of *Salmonella* spp. from poultry (ostrich, pigeon and chicken) and detection of their hilA gene by PCR method," *African Journal of Microbiology Research* 4(24):2678-2681 (Dec. 2010).

Ammar, et al., "Virulence genotypes of clinical *Salmonella* Serovars from broilers in Egypt," *J. Infect. Dev. Ctries.* 10(4):337-346 (Apr. 2016).

Black, et al., "Experimental *Campylobacter jejuni* Infection in Humans," *The Journal of Infectious Diseases* 157(3):472-479 (Mar. 1988).

Borges, et al., "Detection of virulence-associated genea in *Salmonella* Enteritidia iaolatea from chicken in South of Brazil," *Pesq. Vet. Bras.* 33(12):1416-1422 (Dec. 2013).

Cardona-Castro, et al., "PCR test to detect hilA gene sequences of *Salmonella* spp in blood and feces samples," Abstracts of the General Meeting of the American Society for Microbiology, vol. 102, Section No. 237, Abstract C-267, p. 148 (May 2002).

Guyard-Nicodème, et al., "Effect of Feed Additives on Productivity and *Campylobacter* spp. Loads in Broilers Reared under Free Range Conditions," *Frontiers in Microbiology* 8(828):1-7 (May 2017).

Haas, et al., "A Quantitative Real-Time PCR Approach for Assessing *Campylobacter jejuni* and *Campylobacter coli* Colonization in Broiler Herds," *Journal of Food Protection* 80(4):604-608 (Apr. 2017).

Hacker, et al., "Pathogenicity islands of virulent bacteria: structure, function and impact on microbial evolution," *Molecular Microbiology* 23(6):1089-1097 (Mar. 1997).

Heikinheimo, et al., "Enumeration and Isolation of cpe-Positive *Clostridium perfringens* Spores from Feces," *Journal of Clinical Microbiology* 42(9):3992-3997 (Sep. 2004).

Hong, et al., "Rapid Detection of *Campylobacter coli, C. jejuni*, and *Salmonella enterica* on Poultry Carcasses by Using PCR-Enzyme-Linked Immunosorbent Assay," *Applied and Environmental Microbiology* 69(6):3492-3499 (Jun. 2003).

Jiang, et al., "Membrane vesicles of *Clostridium perfringens* type A strains induce innate and adaptive immunity," *International Journal of Medical Microbiology* 304:431-443 (May 2014).

Keyburn, et al., "Association between avian necrotic enteritis and *Clostridium perfringens* strains expressing NetB toxin," *Vet. Res.* 41:21 (accepted Nov. 2009).
Kim, et al., "Noble Polymeric Surface Conjugated with Zwitterionic Moieties and Antibodies for the Isolation of Exosomes from human Serum," *Bioconjug. Chem.* 23:2114-2120 (Oct. 2012).
Koga, et al., "Exosome can prevent RNase from degrading microRNA in feces," *Journal of Gastrointestinal Oncology* 2(4):215-222 (Dec. 2011).
Kukier, et al., "Epidemiological Investigation of Animal Diseases Caused By *Clostridium perfrigens* Strains Isolated From Feedingstuffs," *KRMIVA* 52:339-343 (Jan. 2010).
Lebrun, et al., "Cattle enterotoxaemia and *Clostridium perfringens*: description, diagnosis and prophylaxis," *Veterinary Record* 167(1):13-22 (Jul. 2010).
Leep, et al., "Identification of Novel Pathogenicity Loci in *Clostridium perfringens* Strains That Cause Avian Necrotic Enteritis," *PLOS One* 5(5):e10795 (May 2010).
Li, et al., "Claudin-containing exosomes in the peripheral circulation of women with ovarian cancer," *BMC Cancer* 9:244 (Jul. 2009).
Li, et al., "Toxin Plasmids of *Clostridium perfringens*," *Microbiology and Molecular Biology Reviews* 77(2):208-233 (Jun. 2013).
Lovland, et al., "Diagnosing *Clostridium perfringes*-associated necrotic enteritis in broiler flocks by an immunoglobulin G anti-alpha-toxin enzyme-linked immunosorbent assay," *Avian Pathology* 32(5):527-534 (Oct. 2003).
Mathivanan, et al., "Proteomics Analysis of A33 Immunoaffinity-purfied Exosomes Released from the Human Colon Tumor Cell Line LIM1215 Reveals a Tissue-specific Protein Signature," *Mol. Cell. Proteomics* 9(2):197-208 (Feb. 2010).
Miranda, et al., "Nucleic acids within urinary exosomes/microvesicles are potential biomarkers for renal disease," *Kidney International* 78:191-199 (published online Apr. 2010).
Nakamura, et al., "Small cytoplasmic RNA (scRNA) gene from *Clostridium perfringens* can replace the gene for the *Bacillus subtilis* scRNA in both growth and sporulation," *Microbiology* 141:2965-2975 (1995).
Nilsson, et al., "Prostate cancer-derived urine exosomes: a novel approach to biomarkers for prostate cancer," *Br. J. Cancer* 100(10):1603-1607 (May 2009).
Obana, et al., "Structural Requirement in *Clostridium perfringens* Collagenase mRNA 5' Leader Sequence for Translation Induction through Small RNA-mRNA Base Pairing," *Journal of Bacteriology* 195(12):2937-2946 (Jun. 2013).
Ohtani, et al., "Identification of a novel locus that regulates expression of toxin genes in *Clostridium perfringens*," *FEMS Microbiology Letters* 209:113-118 (published online Mar. 2002).
Oosterom, et al., "Origin and Prevalence of *Campylobacter jejuni* in Poultry Processing," *Journal of Food Protection* 46(4):339-344 (Apr. 1983).
Pajaniappan, et al., "The *Campylobacter jejuni* cj0414 and cj0415 genes encode a gluconate dehydrogenase that is involved in chicken colonization," Abstract of the General Meeting of the American Society for Microbiology, vol. 105, p. 30 (2005); General Meeting of the American Society for Microbiology; Atlanta, Jun. 9, 2005).
Pardon, et al., "Longitudinal study on morbidity and mortality in white veal calves in Belgium," *BMC Veterinary Research* 8(26):1-15 (2012).
Parreira, et al., "Sequence of Two Plasmids from *Clostridium perfringens* Chicken Necrotic Enteritis Isolates and Comparison with *C. perfringens* Conjugative Plasmids," *PLoS One* 7(11):e49753 (Nov. 2012).
Perko-Mäkelä, et al., "Distribution of *Campylobacter jejuni* isolates from Turkey Farms and Different Stages at Slaughter Using Pulsed-Field Gel Electrophoresis and flaA-Short Variable Region," *Zoonoses Public Health* 58(6):388-398 (Sep. 2011).
Perko-Mäkelä, et al., "A longitudinal study of *Campylobacter* distribution in a turkey production chain," *Acta Veterinaria Scandinavica* 51(18):1-10 (Apr. 2009).
Petit, et al., "*Clostridium perfringens*: toxinotype and genotype," *Trends in Microbiology* 7(3):104-110 (Mar. 1999).

(56) References Cited

OTHER PUBLICATIONS

Piercy, "Acute Phase Responses to Experimental Salmonellosis in Calves and Colibacillosis in Chickens: Serum Iron and Caeruloplasmin," *J. Comp. Path.* 89(3):309-319 (Jul. 1979).
Popoff, et al., "Clostridial pore-forming toxins: Powerful virulence factors," *Anaerobe* 30:220-238 (available online Jun. 2014).
Saita, et al., "Pathogenicity markers of *Clostridium* spp. in commercial turkeys," *Italian Journal of Animal Science* 8(4):781-784 (Jan. 2009).
Saleem, "Identification of biochemical markers for sub-clinical necrotic enteritis in broiler chickens" (In: Necrotic enteritis, disease induction, predisposing factors and novel biochemical markers in broiler chickens. Chapter 8, PhD thesis); University of Glasgow, UK (2013).
Schallegger, et al., "Combined *Campylobacter jejuni* and *Campylobacter coli* Rapid Testing and Molecular Epidemiology in Conventional Broiler Flocks," *Zoonoses Public Health* 63(8):588-599 (Dec. 2016).
Schorey, et al., "Exosomes and other extracellular vesicles in host-pathogen interactions," *EMBO Reports* 6(1):24-43 (Jan. 2015).
Shao, et al., "Protein typing of circulating microvesicles allows real-time monitoring of glioblastoma therapy," *Nature Medicine* 18(12):1835-1840 (Dec. 2012).
Skog, et al., "Glioblastoma microvesicles transport RNA and proteins that promote tumour growth and provide diagnostic biomarkers," *Nature Cell Biology* 10(12):1470-1476 (Jan.-Dec. 2008).
Staedel, et al., "MicroRNAs and bacterial infection," *Cellular Microbiology* 15(9):1496-1507 (Sep. 2013).
Sun, et al., "Identification and molecular subtyping of *Campylobacter jejuni* isolated from chicken carcass," *Journal of Hygiene Research* 43(4):608-613 (Jul. 2014).
Taylor, et al., "MicroRNA signatures of tumor-derived exosomes as diagnostic biomarkers of ovarian cancer," *Gynecologic Oncology* 110(1):13-21 (Jul. 2008).
Thery, et al., "Isolation and Characterization of Exosomes from Cell Culture Supernatants and Biological Fluids," *Current Protocols in Cell Biology Chapter 3: Unit 3.22.1* (2006).
Wang, et al., "Integrated analysis of microRNA expression and mRNA transcriptome in lungs of avian influenza virus infected broilers," *BMC Genomics* 13:278 (2012).
Wei, et al., "Abundance of pathogens in the gut and litter of broiler chickens as affected by bacitracin and litter management," *Veterinary Microbiology* 166(3-4):595-601 (Oct. 2013).
Wise, et al., "Quantitive Detection of *Clostridium perfringensin* the Broiler Fowl Gastrointestinal Tract by Real-Time PCR," *Applied and Environmental Microbiology* 71(7):3911-3916 (Jul. 2005).
Wisnieswski, et al., "The Tcp conjugation system of *Clostridium perfringens*," *Plasmid* 91:28-36 (May 2017).
Witwer, et al., "Standardization of sample collection, isolation and analysis methods in extracellular vesicle research," *Journal Extracellular Vesicles* 2:20360 (May 2013).
Wubbolts, et al., "Proteomic and Biochemical Analyses of Human B Cell-derived Exosomes," *J. Biol. Chem.* 278(13):10963-10972 (Mar. 2003).
Zhu, et al., "Prevalence and quantification of *Campylobacter* contamination on raw chicken carcasses for retail in China," *Food Control* 75:196-202 (Dec. 2016).
Rahman, et al., "Intestinal Hypoperfusion Contributes to Gut Barrier Failure in Severe Acute Pancreatitis," *J. Gastrointest. Surg.* 7(1):26-36 (2003).
Wu, et al., "Ovotransferrin: Structure, bioactivities and preparation," *Food Research International* 46(2):480-487 (2012).
Yoo, et al., "Molecular Typing and Epidemiological Survey of Prevalence of *Clostridium perfringens* Types by Multiplex PCR," *Journal of Clinical Microbiology* 35(1):228-232 (Jan. 1997).
Carozzi, et al., "Fecal Collection and Stabilization Methods for Improved Fecal DNA Test for Colorectal Cancer in a Screening Setting," *Journal of Cancer Research* vol. 2013, Article ID 818675 8 pages (2013).
Giansanti, et al., "Physiological roles of ovotransferrin," *Biochim Biophys Acta* 1820(3):218-225 (Mar. 2012).

Helle, et al., "Transferrin-Ovotransferrin," Avian Immunology (Second Edition), (2014); https://www.sciencedirect.com/topics/biochemistry-genetics-and-molecular-biology/ovotransferrin.
Howard, et al., "Urinary albumin, transferrin and iron execretion in diabetic patients," *Kidney International* 40(5):923-926 (1991).
Jochen, "What is bird poop?" (2011). https://www.10000birds.com/what-is-bird-poop.htm.
Miller, et al., "Bacteriophage therapy for control of necrotic enteritis of broiler chickens experimentally infected with Clostridium perfringens," *Avian Diseases* 54(1):33-40 (2010).
Rath, et al., "Serum ovotransferrin as a biomarker of inflammatory diseases in chickens," *Poultry Science* 88(10):2069-2074 (Oct. 2009).
Trung, et al., "Non-Typhoidal *Salmonella* Colonization in Chickens and Humans in thr Mekong Delta of Vietnam," *Zoonoses Public Health* 64(2):94-99 (Mar. 2017).
Xie, et al., "Identification of ovotransferrin as an acute phase protein in chickens," *Poultry Science* 81(1):112-120 (2002).
U.S. Appl. No. 17/627,399, filed Jan. 14, 2022, US-2022/0259642 A1, Aug. 18, 2022, Dargatz.
U.S. Appl. No. 17/794,269, filed Jul. 21, 2022, Raddatz.
Barrett, et al., "Nomenclature: protease, proteinase and peptidase," *The Biochemical Journal* 237(7):935 (1986).
Bilder, et al., "Pooled testing procedures for screening high volume clinical specimens in heterogenous populations," *Stat. Med.* 31(27):3261-3268 (Nov. 2012).
Public Health Veterinarian (Ante-mortem inspection 2016); (Sep. 2016).
Sheng, et al., "Transferrin Dipstick as a Potentila Novel Test for Colon Cancer Screening: A Comparative Study With Immuno Fecal Occult Blood Test," *Cancer Epidemiology, biomarkers & Prevention* 18(8):2182-2185 (2009).
Erol, et al., "Molecular typing of *Clostridium perfringens* isolated from turkey meat by multiplex PCR," *Letters in Applied Microbiology* 47(1):31-34 (2008).
Rood, et al., "Expansion of the *Clostridium perfringens* toxin-based typing scheme," *Anaerobe* 53:5-10 (2018).
Uzal, et al., "*Clostridium perfringens* type C and *Clostridium difficile* co-infection in foals," *Veterinary Microbiology* 156(3-4):395-402 (2012).
Genbank Accession No. EU143239—Clostridium perfringens necrotic enteritis toxin B precursor (netB) gene, complete cds (submitted Sep. 7, 2007, retrieved May 12, 2021 from https://www.ncbi.nlm.nih.gov/nuccore/EU143239).
Genbank Accession No. JF298802—Clostridium perfringens strain CPB228 alpha toxin gene, partial cds (submitted Jan. 30, 2011, retrieved May 13, 2021 from https://www.ncbi.nlm.nih.gov/nuccore/JF298802).
Genbank Accession No. EU839779—Clostridium perfringens strain S01 phospholipase C (plc) gene, complete cds (submitted Jun. 20, 2008, retrieved May 13, 2021 from https://www.ncbi.nlm.nih.gov/nuccore/EU839779).
Abilgaard, et al., "Sequence variation in the a-toxin encoding plc gene of Clostridium perfringens strains isolated from diseased and healthy chickens," *Veterinary Microbiology* 136(3-4):293-299 (May 2009).
Abnous, et al., "Diets Enriched in Oat Bran or Wheat Bran Temporally and Differentially Alter the Composition of the Fecal Community of Rats," *The Journal of Nutrition* 139(11):2024-2031 (Sep. 2009).
Albini, et al., "Real-time multiplex PCR assays for reliable detection of Clostridium perfringens toxin genes in animal isolates," *Veterinary Microbiology* 127(1-2):179-185 (Feb. 2008).
Barwick, et al., "Prevalence of *Giardia* spp. and *Cryptosporidium* spp. on dairy farms in southeastern New York state," *Preventive Veterinary medicine* 59(1-2):1-11 (May 2003).
Brassard, et al., "Real-time PCR study of infection dynamics of Torque teno sus viruses in naturally infected pigs from nursery to slaughterhouse," *The Veterinary Journal* 197(2):506-508 (Aug. 2013).
Chandler-Bostock, et al., "Diversity of group A rotovirus on a UK pig farm," *Verterinary Microbiology* 180(3-4):205-211 (Nov. 2015).

(56) References Cited

OTHER PUBLICATIONS

Elder, et al., "Correlation of enterohemorrhagic *Escherichai coli* 0157 prevalence in feces, hides and carcasses of beef cattle during processing," *PNAS* 97(7):2999-3003 (Mar. 2000).
Farzan, et al., "An investigation into the association between cpb2-encoding Clostridium perfringens type A and diarrhea in neonatal piglets," *Canadian Journal of Veterinary Research* 77(1):45-53 (Jan. 2013).
Fernandes Da Costa, et al., "Protection against avian necrotic entertitis after immunisation with NetB genetic or formaldhyde toxoids," *Vaccine* 31:4003-4008 (2013).
Hofshagen, et al., "Toxin Production by Clostridium perfringens Isolated from Broiler Chickens and Capercaillies (Tetrao urogallus) with and without Necrotizing Enteritis," *Avian Diseases* 36(4):837-843 (Oct. 1992).
Kätterer, et al., "The impact of altered managment on long-term agriculture soil carbon stocks—a Swedish case study," *Nutrient Cycling in Agroecosystems* 70(2):179-187 (Oct. 2004).
Keyburn, et al., "Alpha-Toxin of *Clostridium perfringens* Is Not an Essential Virulence Factor in Necrotic Enteritis in Chickens," *Infection and Immunity* 74(11):6496-6500 (Nov. 2006).
Keyburn, et al., "NetB, a New Toxin That Is Associated with Avian Necrotic Enteritis Caused by *Clostridium perfringens*," *PLoS Pathogens* 4(2):e26 (Feb. 2008).
Lee, et al., "Identification and cloning of two immunogenic *Clostridium perfringes* proteins, elongation factor Tu (EF-Tu) and pyruvate:ferredoxin oxidoreductase (PFO) of *C. perfringens*," *Research in Veterinary Science* 91(3)e80-e86 (Jan. 2011).
Lee, et al., "Immune and anti-oxidant effects of in ovo selenium proteinate on post-hatch experimental avian necrotic enteritis," *Veterinary Parasitology* 206(3):115-122 (Oct. 2014).
Llanco, et al., "Toxinotyping and antimicrobial susceptibility of Clostridium perfringens isolated from broiler chickens with necrotic enteritis," *International Journal of Microbiology Research* 4(7):290 (2012).
McCourt, et al., "Sandwich ELISA detection of *Clostridium perfringens* cells and α-toxin from field cases of necrotic enteritis of poultry," *Veterinary Microbiology* 106:259-264 (2005).
Miles, et al., "Spacial Contrasts of Seasonal and Intraflock Broiler Litter Trace Gas Emissions, Physical and Chemical Properties," *J. Environ. Qual.* 177(2):176-187 (Jan. 2011).
Mostafa, et al., "Research Article: Multiplex PCR and Detection of netB Gene of Clostridium perfringens from Broilers with Necrotic Enteritis," *Asian J. Anim. Vet. Adv.* 11:248-252 (Mar. 2016).
Musella, et al., "On the use of posterior predictive probabilities and prediction uncertainty to tailor informative sampling for parasitological surveillance in livestock," *Veterinary Parasitology* 205(1-2):158-168 (Sep. 2014).
Park, et al., "Characterization of *Clostridium perfrigens* isolates obtained from 2010 to 2012 from chickens with necrotic enteritis in Korea," *Poultry Science* 94(6):1158-1164 (Apr. 2015).
Popoff, et al., "Genetic characteristics of toxigenic Clostridia and toxin gene evolution," *Toxicon* 75:63-89 (available online May 2013).
Rood, "Virulence Genes of *Clostridium perfringens*," *Annu. Rev. Microbiol.* 52:333-360 (1998).
Schepers, et al., "Site-Specific Considerations for Managing Phosphorus," *J. Environ. Qual.* 29(1):125-130 (Jan. 2000).
Shojadoost, et al., "The successful experimental induction of necrotic enteritis in chickens by *Clostridium perfringes*: a critical review," *Veterinary Research* 43:74 (2012).
Smith, et al., "Phenotypic and genotypic profiling of antimicrobial resistance in enteric *Escherichia coli* communities isolated from finisher pigs in Australia," *Australian Veterinary Journal* 94(10):371-376 (Oct. 2016).
Timbermont, et al., "Necrotic enteritis in broilers: an updated review on the pathogenesis," *Avian Pathology* 40(4):341-347 (2011).
Titball, et al., "The *Clostridium perfringens* α-toxin," *Anaerobe* 5:51-64 (1999).

Van De Poel, et al., "Norwalk-Like Calicvirus Genes in Farm Animals," *Research* 6(1)36-41 (Jan.-Feb. 2000).
Whittington, et al., "Use of Pooled Fecal Culture for Sensitive and Economic Detection of *Mycobacterium avium* subsp. paratuberculosis Infection in Flocks of Sheep," *Journal of Clinical Microbiology* 38(7):2550-2556 (Jul. 2000).
Williams, et al., "A new method for the experimental production of necrotic enteritis and its use for studies on the relationships between necrotic enteritis, coccidiosis and anticoccidial vaccination of chickens," *Parasitol Res.* 90:19-26 (2003).
Wu, et al., "Optimized Necrotic Enteritis Model Producing Clinical and Subclinical Infection of *Clostridium perfringens* in Broiler Chickens," *Avian Diseases* 54:1058-1065 (2010).
Wu, et al., "Two necrotic enteritis predisposing factors, dietary fishmeal and *Eimeria* infection, induce large change in the caecal microbiota of broiler chickens," *Veterinary Microbiology* 169:188-197 (2014).
Xie, et al., "Prevalence of lapine rotavirus, astrovirus, and hepatitus E virus in Canadian domestic rabbit populations," *Veterinary Microbiology* 208:146-149 (Jul. 2017).
U.S. Appl. No. 15/555,531, filed Sep. 4, 2017, US 2018-0312905 A1, Nov. 1, 2018, Igwe.
U.S. Appl. No. 16/612,398, filed Nov. 10, 2019, US-2021/0139955 A1, May 13, 2021, Flügel.
U.S. Appl. No. 16/652,657, filed Mar. 31, 2020, US 2020/0239938 A1, Jul. 30, 2020, Kappel.
U.S. Appl. No. 16/977,003, filed Aug. 31, 2020, US 2021/0003592 A1, Jan. 7, 2021, Flügel.
U.S. Appl. No. 16/977,023, filed Aug. 31, 2020, US 2021/0011027 A1, Jan. 14, 2021, Flügel.
U.S. Appl. No. 17/059,431, filed Nov. 28, 2020, US-2021/0207193 A1, Jul. 8, 2021, Thiemann.
U.S. Appl. No. 17/252,254, filed Dec. 14, 2020, US-2021/0262031 A1, Aug. 26, 2021, Igwe.
"Clostridium perfringens NetB DNA SEQ ID: 1", XP-002761707, Database accession No. AUJ86218 (Feb. 2009).
"Human PRO nucleotide sequence SEQ ID: 410", XP-002761706, Database accession No. AUZ24794 (Mar. 2009).
"Clostridium perfringens strain NE_10 plasmid pNetB-NE10, complete sequence," XP-002761708, Database accession No. JQ655731 (Dec. 2012).
Database WPI, Thomson Scientific, London, GB; XP-002744039; CN 102 697 812 A (Univ. Shandong Agric.), abstract (Oct. 2012).
Database accession No. BDE57256; *Clostridium perfringens* netB gene specific forward PCR primer, (Nov. 2016).
Database accession No. EA946288; Sequence 166055 from U.S. Pat. No. 7,374,927; (Aug. 2008).
Database accession No. EA876028; Sequence 95795 from U.S. Pat. No. 7,374,927; (Aug. 2008).
Database accession No. BCL09680; Avena sativa BAD specific multiplex PCR primer; (Mar. 2016).
Database accession No. BCL16835; Avena sativa BAD specific multiplex PCR primer; (Mar. 2016).
Database accession No. HJ900945; Sequence 97404 from U.S. Pat. No. 8,673,560; (Feb. 2015).
Database accession No. AWZ90261; *Clostridium perfrigens* detecting PCR primer; (Jul. 2009).
Database accession No. AFB71766; *Campylobacter* sp. PCR primer; (May 2007).
Database accession No. HW832967; A method for simultaneous detection and/or quantification of multiple bacteria; (Oct. 2015).
Database accession No. GS_NUC_ALERT:WO2016201272. 163953; standard, peptide; (Jun. 2015).
Aade, et al., "Haematological parameters change in *Gallus gallus domesticus* infected with cestode parasite," *International Multidisciplinary Research Journal* 2(4):13-15 (accepted Apr. 2012).
Abeyrathne, et al.. "Sequential separation of lysozyme, ovomucin, ovotransferrin, and ovalbumin from egg white," *Poultry Science* 93(4):1001-1009 (Mar. 2014).
Allaart, et al., "NetB-producing and beta2-producing *Clostridium perfringes* associated with subclinical necrotic enteritis in laying hens in the Netherlands," *Avian Pathology* 41(6):541-546 (2012).

(56) References Cited

OTHER PUBLICATIONS

Benjamini, et al., "Controlling the False Discovery Rate: a Practical and Powerful Approach to Multiple Testing," *J.R. Statist. Soc. B.* 57(1):289-300 (received Jan. 1993).
Bischoff, et al., "Intestinal permeability—a new target for disease prevention and therapy," *BMC Gastroenterology* 14(1):189; pp. 1-25 (Nov. 2014).
Chapman, "Milestones in avian coccidiosis research: A review," *Poultry Science* 93:501-511 (2014).
Chen, et al., "Identification of potential biomarkers for gut barrier failure in broiler chickens," *Frontiers in Veterinary Science* 2:14; pp. 1-10 (May 2015).
Chen, et al., "Microfluidic isolation and transcriptome analysis of serum microvesicles," *Lab on a Chip* 10:505-511 (available online Dec. 2009).
Cheruvanky, et al., "Rapid isolation of urinary exosomal biomarkers using a nanomembrane ultrafiltration concentrator," *Am. J. Physiol. Renal Physiol.* 292(5):F1657-1661 (May 2007).
Chuka, et al., "A Comparison of the haematological and biochemical indices of broiler and red jungle (Hamburgh) fowl (*Gallus gallus domesticus*)," *Discovery Nature* 1(1):15-18 (Oct. 2012).
Clayton, et al., "Analysis of antigen presenting cell derived exosomes, based on immuno-magnetic isolation and flow cytometry," *J. Immunol. Methods* 247:163-174 (Jan. 2001).
Cooper, et al., "Diagnosing clostridial enteric disease in poultry," *Journal of Veterinary Diagnostic Investigation* 25(3):314-327 (2013).
Dalloul, et al., "Poultry coccidiosis: recent advancements in control measures and vaccine development," *Expert Rev. Vaccines* 5:143-163 (2006).
Ding, et al., "Transport of Antihypertensive Peptide RVPSL, Ovotransferrin 328-332, in Human Intestinal Caco-2 Cell Monolayers," *Journal of Agriculture and Food Chemistry* 63(37):8143-8150 (Sep. 2015).
Dinh, et al., "Modulation of microRNAs in two genetically disparate chicken lines showing different necrotic enteritis disease susceptibility," *Vet. Immunol. Immunopathol.* 159:74-82 (May 2014).
Fukui, et al., "Changes of Intestinal Functions in Liver Cirrhosis," *Inflammatory Intestinal Diseases* 1(1):24-40 (Published online Mar. 2016).
Garcia, et al., "Experimental infection of commercial layers using a *Salmonella enterica* serovar Gallinarum strain: Leukogram and serum acute-phase protein concentrations," *Brazillian Journal of Poultry Science* 11:263-270 (Oct.-Dec. 2009).
Gholamiandehkordi, et al., "Quantification of gut lesions in a subclinical necrotic enteritis model," *Avian Pathology* 36(5):375-382 (Oct. 2007).
Gilani, et al., "New biomarkers for increased intestinal permeability induced by dextran sodium sulphate and fasting in chickens," *J Anim Physiol Anim Nutr* 101(5):e237-e245 (2017).

Gohari, et al., "A Novel Pore-Forming Toxin in Type A *Clostridium perfringens* Is Associated with Both Fatal Canine Hemorrhagic Gastroenteritis and Fatal Foal Necrotizing Enterocolitis," *PLoS One* 10(4):1-27 (Apr. 2015).
Goossens, et al., "*Clostridium perfringens* strains from bovine enterotoxemia cases are not superior in in vitro production of alpha toxin, perfringolysin O and proteolytic enzymes," *BMC Veterinary Research* 10(32):1-7 (2014).
Goossens, et al., "Elevated faecal ovotransferrin concentrations are indicative for intestinal barrier failure in broiler chickens," *Vet Res* 49(1):1-8 (Jun. 2018).
Guerrant, et al., "Biomarkers of Environmental Enteropathy, Inflammation, Stunting and Impaired Growth in Children in Northeast Brazil," *PLOS One* 11(9):1-20 (Sep. 2016).
Johnson, et al., "Anticoccidial drugs: lesion scoring techniques in battery and floor-pen experiments with chickens," *Exp Parasitol* 28(1):30-36 (Aug. 1970).
Kogut, et al., "Editorial: Gut Health: The New Paradigm in Food Animal Production," *Frontiers in Veterinary Science* 3(71):1-4 (Aug. 2016).
Lee, et al., "Therapeutic potential of hen egg white peptides for the treatment of intestinal inflammation," *Journal of Functional Foods* 1(2):161-169 (Apr. 2009).
Moore, et al., "Necrotic enteritis predisposing factors in broiler chickens," *Avian Pathology* 45:275-281 (Accepted Jan. 2016).
M'Sadeq, et al., "Towards the control of necrotic enteritis in broiler chickens with in-feed antibiotics phasing-out worldwide," *Animal Nutrition* 1:1-11 (Available online Mar. 2015).
O'Reilly, et al., "Acute phase proteins: a review of their function, behaviour and measurement in chickens," *World Poultry Science Journal* 70(1):27-44 (Mar. 2014).
O'Reilly, Emily "Acute phase proteins and biomarkers for health in chickens," PHD thesis, University of Glasgow, Scotland, pp. 1-137 (Jan. 2016).
O'Reilly, Emily "Acute phase proteins and biomarkers for health in chickens," PHD thesis, University of Glasgow, Scotland, pp. 138-316 (Jan. 2016).
Pavia, et al., "Necrotic enteritis: Applications for the poultry industry," *Journal of Applied Poultry Research* 23:557-566 (2014).
Vicuña, et al., "Dose titration of FITC-D for optimal measurement of enteric inflammation in broiler chicks," *Poultry Science* 94:1353-1359 (Accepted Feb. 2015).
Williams, "Intercurrent coccidiosis and necrotic enteritis of chickens: rational, integrated disease management by maintenance of gut integrity," *Avian Pathology* 34(3):159-180 (2005).
Xie, et al., "Changes in Serum Ovotransferrin Levels in Chickens with Experimentally Induced Inflammation and Diseases," *Avian Dis* 46(1):122-131 (2002).

\* cited by examiner

IN VITRO METHOD FOR DETECTING AVIAN INTESTINAL DYSBIOSIS

CROSS REFERENCE TO RELATED APPLICATIONS

The present application is US national stage of international application PCT/EP2019/084170, which had an international filing date of Dec. 9, 2019 and which was published on Jun. 18, 2020. The application claims priority to EP 18212599.7, filed on Dec. 14, 2018. The content of these prior applications is hereby incorporated by reference in its entirety.

FIELD OF THE INVENTION

The present invention relates to an in vitro method for detecting avian intestinal dysbiosis, the method comprising determining the presence and/or level of isoleucyl-arginine ($C_{12}H_{25}O_3N_5$) or isomers thereof in avian sample material, wherein the presence and/or an increased level of isoleucyl-arginine ($C_{12}H_{25}O_3N_5$) in comparison to a non-affected control is indicative for avian intestinal dysbiosis.

BACKGROUND OF THE INVENTION

Intestinal health is critically important for the welfare and performance of avian livestock animals.

The gastrointestinal tract (GIT) of avians hosts a complex microbial ecosystem containing trillions of microbes. These microbes are distributed throughout various niches performing diverse functions including the fermentation of foods. The microbial diversity within the GIT is a function of site of digestion, health status and age of the birds. Under normal conditions, the disease-inducing activity (dysbiosis) and disease-protective activity (probiosis) is perfectly balanced. However, even a slight disturbance in normal microbiota of the gut can lead to an imbalance of host-microbe relationships. This state of condition where microbial imbalance exerts adverse effects on the host is known as dysbiosis (dysbacteriosis).

Dysbiosis is detrimental to the host, leading to inflammation and mucosal tissue damage that predisposes them to pathological conditions like *Clostridium perfringens* infection or inflammatory bowel disease.

Ducatelle et al. in "Biomarkers for monitoring intestinal health in poultry: present status and future perspectives", VETERINARY RESEARCH, vol. 49, no. 1, 8 May 2018 provide an overview about biomarkers related to intestinal health that are commonly known in the art, such as D-lactate in blood and liver and butyrate in cecal content/feces.

*Clostridium perfringens* is an ubiquitous pathogen that uses an arsenal of toxins to cause histotoxic and intestinal infections in animals and also in humans. *C. perfringens* is a Gram-positive, rod-shaped, spore forming, oxygen-tolerant anaerobe. Not all *C. perfringens* strains are virulent. As an animal pathogen, *C. perfringens* is responsible for several serious diseases including avian necrotic enteritis, which drains approximately US$6 billion/year from the global agricultural system [Wade, B., Keyburn, A. L. (2015), "The true cost of necrotic enteritis" *World Poultry* 31, 16-17].

Further, the disruption of the microbiota, for instance due to antibiotic treatment, favors growth of pathogenic bacteria, such as *Salmonella* (Santos R L. Pathobiology of *salmonella*, intestinal microbiota, and the host innate immune response. Front Immunol. 2014 May 26; 5:25), *Campylobacter* (Agunos A, Waddell L, Leger D, Taboada E. A systematic review characterizing on-farm sources of *Campylobacter* spp. for broiler chickens. PLoS One. 2014; 9(8):e104905. Published 2014 Aug. 29. doi:10.1371/journal.pone.0104905) *Escherichia coli* (colibacillosis: *Yersinia enterocolitica* (Mohammad M. Soltan Dallal, Michael P. Doyle, Maryam Rezadehbashi, Hossein Dabiri, Maryam Sanaei, Shabnam Modarresi, Rounak Bakhtiari, Kazem Sharifiy, Mahnaz Taremi, Mohammad R. Zali, M. K. Sharifi-Yazdi, Prevalence and antimicrobial resistance profiles of *Salmonella* serotypes, *Campylobacter* and *Yersinia* spp. isolated from retail chicken and beef, Tehran, Iran, Food Control, Volume 21, Issue 4, 2010, p 388-392)), and *Pseudomonas* (Devriese L A, Viaene N J, Demedts G. *Pseudomonas aeruginosa* infection on a broiler farm. Avian Pathol. 1975; 4(3):233-7).

In view of the above and in order to enable a timely and targeted intervention against avain intestinal dysbiosis, it was an urgent need to provide a fast and reliable, non-invasive ante mortem method for detecting dysbiosis in avian subjects or in avian populations.

SUMMARY OF THE INVENTION

The present invention provides an in vitro method for detecting avian intestinal dysbiosis, the method comprising determining the presence and/or level of isoleucyl-arginine ($C_{12}H_{25}O_3N_5$, Mw=287.20) or isomers thereof in avian sample material, wherein the presence and/or an increased level of isoleucyl-arginine ($C_{12}H_{25}O_3N_5$, Mw=287.20) or isomers thereof in comparison to a non-affected control is indicative for avian intestinal dysbiosis.

Further, the present invention pertains to the use of isoleucyl-arginine ($C_{12}H_{25}O_3N_5$, Mw=287.20) or isomers thereof as markers for detecting avian intestinal dysbiosis, for deducting the necessity of nutritional or therapeutic interventions to be taken against avian intestinal dysbiosis, or for controlling the effectiveness of nutritional or therapeutic interventions taken against avian intestinal dysbiosis.

Finally, the present invention provides an in vitro mass-spectrometry-based method for detecting avian intestinal dysbiosis, the method comprising assaying avian sample material for isoleucyl-arginin or isomers thereof ($C_{12}H_{25}O_3N_5$, m/z=144.61, Mw=287.20), wherein the presence and/or an increased level of said biomarker indicates avian intestinal dysbiosis.

In the following, the crucial aspects of the present invention are described in detail.

DETAILED DESCRIPTION OF THE INVENTION

The inventors have unexpectedly found that isoleucyl-arginine ($C_{12}H_{25}O_3N_5$, Mw=287.20) or isomers thereof constitute a diagnostic marker suitable for detecting avian intestinal dysbiosis.

Accordingly, the invention provides an in vitro method for detecting avian intestinal dysbiosis, the method comprising determining the presence and/or level of isoleucyl-arginine ($C_{12}H_{25}O_3N_5$, Mw=287.20) or isomers thereof in avian sample material wherein the presence and/or an increased level of isoleucyl-arginine ($C_{12}H_{25}O_3N_5$, Mw=287.20) or isomers thereof in comparison to a non-affected control is indicative for avian intestinal dysbiosis.

$C_{12}H_{25}O_3N_5$ is a dimeric amino acid occurring in the form of four possible isomers:

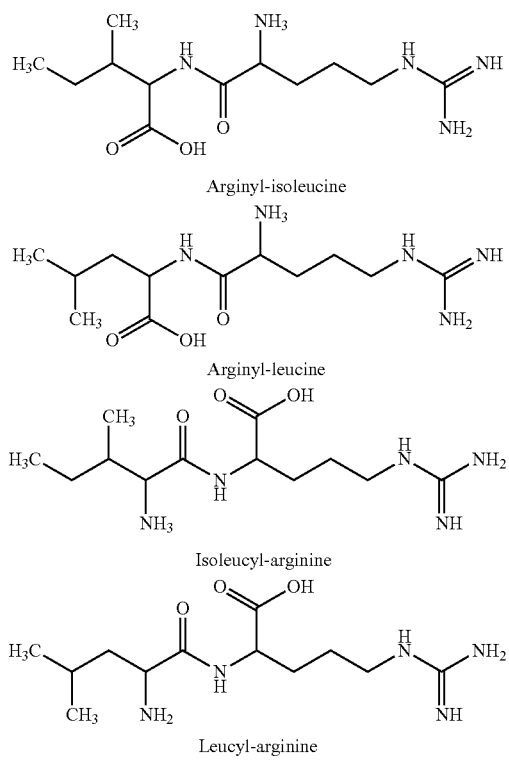

Arginyl-isoleucine

Arginyl-leucine

Isoleucyl-arginine

Leucyl-arginine

As each one of these isomers may serve as a biomarker for detecting avian intestinal dysbiosis, the term "isoleucyl-arginine" as used in the context of the present invention includes all four isomers depicted in the above.

As used in the context of the present invention, intestinal dysbiosis is a term for a microbial imbalance or maladaptation in the gastrointestinal tract, as defined in the above.

The non-affected control is a reference sample representing a proven intact gastrointestinal tract. As an example, a reference sample may be taken within an animal trial from an animal of a non-treated control, which was checked via pathology, histopathology and/or other measures to have no signs of dysbiosis.

The method of the present invention may be either applied for an individual avian subject or for a group or population of avians, e.g. for an avian population as occurring in livestock production.

The avian subject to be tested is preferably poultry. Preferred poultry according to the invention are chickens, turkeys, ducks and geese. The poultry can be optimized for producing young stock. This type of poultry is also referred to as parent and grandparent animals. Preferred parent and grandparent animals are, accordingly, (grand)parent broilers, (grand)parent ducks, (grand)parent turkeys and (grand)parent geese.

The poultry according to the invention can also be selected from fancy poultry and wild fowl. Preferred fancy poultry or wild fowl are peacocks, pheasants, partridges, guinea fowl, quails, capercailzies, goose, pigeons and swans. Further preferred poultry according to the invention are ostriches and parrots. Most preferred poultry according to the invention are broilers.

Preferably, the avian sample material is or comprises avian excremental material, in particular avian feces.

The intestinal sample material obtained from an individual avian may be selected from the group consisting of gut content samples, samples of bodily excrements and solutions or suspensions thereof; and from materials being contaminated with bodily excrements. The term "gut content" is to be understood as the content of the small intestine, the content of the large intestine and/or the content of the caecum. Methods for taking such gut content samples are known in the art.

As used in the context of the present invention, bodily excrements are fecal or cecal excrements. Materials being contaminated with bodily excrements are, for example, dust samples, swab samples, litter samples, liquid manure samples, fur samples, feather samples and skin samples.

In general, the term "litter" is to be understood as a mixture of animal excrements with the bedding material.

As used in the context of this embodiment, the term "litter samples" refers to excremental droppings from an individual animal. Further, in the context this embodiment, the term "liquid manure samples" refers to an excremental sample containing feces and urine from an individual animal.

Samples from individual animals can be taken either directly from the animal, e.g. with swabs. Alternatively and especially in case of single-housed animals, the sample material can be collected from the floor of the pen, cage or slat. The sample material has to be assignable to the investigated animal.

In one embodiment, the intestinal sample material used for determining whether or not an individual animal suffers from dysbiosis is feces.

For specific applications, it is also useful to analyze gut content samples, e.g. samples from the small intestine, samples from the large intestine and/or samples from the caecum.

In an alternative embodiment, the method is used for determining whether or not an avian population suffers from dysbiosis. In that case, the sample material is a pooled sample originating from the avian population to be tested. The avian sample material preferably is or comprises pooled avian feces deriving from an avian flock. The animal population preferably is an avian flock. The avian flock according to the invention is preferably poultry. Preferred poultry is as indicated in the before.

Accordingly, the method of the present invention is particularly suitable for determining the health status of an avian population via bulk testing. As used herein, the term "bulk testing" refers to a test method, wherein the sample material is a pooled sample of an animal population. A "pooled sample" in the context of this embodiment is to be understood as a composite sample from randomly selected separate samples, one sample taken with one or several moistened fabric swabs or pooled samples made up of separate samples of fresh samples taken at random from a number of sites in the house or space in which the animal population or the animal flock is kept. It may be necessary that the sample material is homogenized prior to sample analysis. Suitable homogenization techniques are known in the art.

As used in the context of the invention, the term "litter samples" refers to mixed excremental droppings in the pen, cage or slat. Further, in the context this embodiment, the term "liquid manure samples" refers to mixed excremental samples containing feces and urine.

These litter samples can, for example, be collected from an animal population using the overshoe method or using litter grabs at different places in the pen.

Boot swabs being sufficiently absorptive to soak up moisture are particularly suitable for collecting pooled animal samples. Tube gauze socks are also acceptable.

In case the animal population is kept in cages or slats, the excremental samples may be collected by a conveying belt.

Suitable sample volumes are, for example, 0.05 ml to 20 ml or 0.1 to 20 ml, in particular 0.2 to 10 ml, preferably 0.5 to 5 ml. Suitable sample masses are, for example 0.05 g to 20 g or 0.1 to 20 g, in particular 0.2 to 10 g, preferably 0.5 to 5 g.

The pooled samples reflect the amount of isoleucyl-arginine ($C_{12}H_{25}O_3N_5$, Mw=287.20) present in the animal population.

The isoleucyl-arginine ($C_{12}H_{25}O_3N_5$, Mw=287.20) or isomers thereof may be detected and/or quantified via LC-MS. As an alternative, isoleucyl-arginine ($C_{12}H_{25}O_3N_5$, Mw=287.20) or isomers thereof may be detected and/or quantified via an enzyme assay.

The isoleucyl-arginine ($C_{12}H_{25}O_3N_5$, Mw=287.20) or isomers thereof may also be detected and/or quantified via Liquid chromatography (LC) combined with pre- or post-column derivatization and with fluorescence or UV detection. Therefor, a wide variety of alternative pre- and post-column derivatization protocols may be used reagents such as ninhydridrin, o-phthalaldehyde (OPA), phenylisothiocyanate (PITC), 4-(dimethylamino)azobenzene-4'-sulfonyl (DABSYL) chloride, 5-(dimethylamino)naphthalene-1-sulfonyl (DANSYL) chloride, or 6-aminoquinolyl-N-hydroxysuccinimidyl carbamate (AQC) involving either UV or (mostly) fluorescence detection.

In accordance with the above, the present invention is also directed to the use of isoleucyl-arginine ($C_{12}H_{25}O_3N_5$, Mw=287.20) or isomers thereof as markers for detecting avian intestinal dysbiosis.

The present invention provides the abovementioned methods for detecting dysbiosis and for determining the extent thereof, respectively. This enables the farmer to make a qualified decision on whether or not measures for improving intestinal health are to be taken.

Accordingly, the methods according to the present invention may be used for deducting the necessity of nutritional or therapeutic interventions to be taken against avian intestinal dysbiosis, or, alternatively, for controlling the effectiveness of nutritional or therapeutic interventions taken against avian intestinal dysbiosis.

Measures against the development and/or against the progression of dysbiosis involve feeding or administering health-promoting substances, such as zootechnical feed additives, or therapeutic agents. The term "administering" or related terms includes oral administration. Oral administration may be via drinking water, oral gavage, aerosol spray or animal feed. The term "zootechnical feed additive" refers to any additive used to affect favorably the performance of animals in good health or used to affect favorably the environment. Examples for zootechnical feed additives are digestibility enhancers, i.e. substances which, when fed to animals, increase the digestibility of the diet, through action on target feed materials; gut flora stabilizers; micro-organisms or other chemically defined substances, which, when fed to animals, have a positive effect on the gut flora; or substances which favorably affect the environment. Preferably, the health-promoting substances are selected from the group consisting of probiotic agents, praebiotic agents, botanicals, organic/fatty acids, zeolithes, bacteriophages and bacteriolytic enzymes or any combinations thereof.

The present invention also pertains to a mass spectrometry—based method for detecting avian intestinal dysbiosis, the method comprising assaying avian sample material for isoleucyl-arginin or isomers thereof ($C_{12}H_{25}O_3N_5$, m/z=144.61, Mw=287.20), wherein the presence and/or an increased level of said biomarker indicates avian intestinal dysbiosis.

Preferably, the avian sample material is a pooled fecal sample.

Applications of the methods according to the invention are for example ((i) aiding in the diagnosis and/or prognosis of avian intestinal dysbiosis, (ii) monitoring the progress or reoccurrence of avian intestinal dysbiosis, or (iii) aiding in the evaluation of treatment efficacy for an animal population undergoing or contemplating treatment.

Applications of the methods according to the present invention in particular help to avoid loss in animal performance like weight gain and feed conversion.

In the following, the invention is illustrated by non-limiting examples and exemplifying embodiments.

EXAMPLES

Methods
1. Extraction Protocol for Metabolic Fingerprinting of Broiler Feces

Weigh 100 mg dry weight feces in a 15 mL tube,
Add 2 mL of ice cold 80% MeOH,
Add 100 µL of 100 ng µL-1 valine-d8 (internal standard),
Vortex 1 min and rotate 2 min,
Centrifuge at 1000 rpm for 10 min (at room temperature),
Transfer the supernatant into a 15 mL tube,
Use an 1 mL syringe with needle to transfer the supernatant to a 0.45 µm PA filter,
Collect the filtrate in a 1.5 mL Eppendorf vial,
Dilute (1:3, i.e. one part filtrate, 2 parts $H_2O$) the filtrate with ultra pure $H_2O$ and vortex 15 s,
Transfer 125 µl filtrate to an LC-MS vial.

2. Liquid Chromatography

Chromatographic separation was achieved on a Accela UHPLC pumping system (Thermo Scientific) equipped with an Acquity HSS T3 column (150×2.1, 1.8 µm, Waters). The mobile phase consisted of 0.1% formic acid in water and 0.1% formic acid in acetonitrile, employed for gradient-based elution of the targeted compounds (Table 1). Chromatographic separation of these compounds was effectuated in 18 minutes, at a flow rate of 0.4 mL min-1 and column oven temperature of 45° C. Applied elution gradient program of LC-MS method with 0.1% formic acid in water (solvent A) and 0.1% formic acid in acetonitrile (solvent B):

| Time (min) | Solvent A | Solvent B |
| --- | --- | --- |
| 0 | 98 | 2 |
| 1.5 | 98 | 2 |
| 7 | 75 | 25 |
| 8 | 40 | 60 |
| 12 | 5 | 95 |
| 14 | 5 | 95 |
| 14.1 | 98 | 2 |
| 18 | 98 | 2 |

3. Mass Spectrometry

The used full-scan high-resolution Exactive™ Orbitrap mass spectrometer (Thermo Fisher Scientific) was equipped with a HESI-II source. Mass spectrometric analysis was performed in polarity switching mode, thereby alternating between positive and negative ionization mode from scan to scan. This allowed to obtain data about positive and negative ions during each single run. Accurate mass spectra were acquired in an m/z scan range of 50-800 Da, at a mass resolution of 100,000 FWHM. Other instrumental parameters are presented in Table 2. Optimization of these parameters was based on a standard mixture, containing the analytical standards of 115 polar metabolites.

| Parameter | Value | Parameter | Value |
|---|---|---|---|
| Sheath gas flow (AU) | 50 | HESI-II positions | 0/B/1 |
| Auxiliary gas flow (AU) | 25 | Skimmer voltage (V) | +/−20 |
| Sweep gas flow (° C.) | 5 | Tube lens voltage (V) | +/−60 |
| Capillary temperature (° C.) | 250 | Capillary voltage (V) | +/−90 |
| Heater temperature (° C.) | 350 | Fragmentation | HCD gas off |
| Spray voltage (V) | 5 | AGC target | Balanced |

EXAMPLES

Broiler chickens were infected with *C. perfringens*. Additionally, coccidiose and dysbiosis was induced. Litter samples were collected for subsequent analysis from pens according to the following table:

Litter sample table for metabolomics analyses from infected, non-infected, infected non-pathogenic strains, coccidiosis and dysbiosis broiler chickens

| Trial | Sample origin | Total number of samples | Infection BHI (control) Un-infected | Infection Pathogen | Infection Non-Pathogen | Coccidiosis | Dysbiosis/ Coccidiosis |
|---|---|---|---|---|---|---|---|
| Batch 1 | litter | 30 | 3 | 21 | 6 | — | — |
| Batch 2 | litter | 21 | 3 | 13 | 5 | — | — |
| Batch 4 | litter | 19 | 6 | | | 7 | 6 |
| Batch 5 | litter | 19 | 6 | 4 (field) | 3 (field) | | 6 |

Samples were extracted and analyzed via LC-MS as detailed in the materials and methods section above.

The trials and field studies revealed the metabolite $C_{12}H_{25}O_3N_5$ with a high accurate mass of 144.6056 m/z and a retention time (RD of 1.49 min as a marker for dysbiosis in broiler chickens. More specifically, this metabolite showed higher abundances in litter samples, obtained from dysbiosis birds. This metabolite was either absent or showed much lower abundances in samples from healthy birds and birds with NE.

The results are presented in the below. Three groups of birds were considered: (1) healthy birds, (2) dysbiosis birds and (3) birds suffering from necrotic enteritis.

Integrated peak areas (arbitrary units), as obtained for the metabolite biomarker in the various litter samples, categorized as either necrotic enteritis (NE), dysbiosis or healthy.

| Sample | Category | Marker $C_{12}H_{25}O_3N_5$ |
|---|---|---|
| 1 | NE | 1216377 |
| 2 | NE | 0 |
| 3 | NE | 2358412 |
| 4 | NE | 2391243 |
| 5 | Dysbiosis | 6065093 |
| 6 | Dysbiosis | 2869630 |
| 7 | Dysbiosis | 950729 |
| 8 | Dysbiosis | 3812383 |
| 9 | Dysbiosis | 4559121 |
| 10 | Dysbiosis | 1568876 |
| 11 | Healthy | 0 |
| 12 | Healthy | 693921 |
| 13 | Healthy | 603716 |
| 14 | Healthy | 0 |
| 15 | Healthy | 250469 |
| 16 | Healthy | 0 |
| 17 | Healthy | 288096 |
| 18 | Healthy | 1127064 |
| 19 | Healthy | 692537 |

Fragmentation Analysis
- dd-$MS^2$/dd-SIM
- 17,500 resolution
- 2 e5 AGC target
- Max injection time of 80 ms
- Isolation window of 2.0 m/z
- NCE: 20; 35; 60
- Minimum AGC target of 1 e4
- Apex trigger 2 to 5 s
- Dynamic exclusion 10.0 s Fragmentation Spectrum of $C_{12}H_{25}O_3N_5$—Fragmented at an Energy of 38.33 eV

| m/z-value of fragment | Absolute intensity (arbitrary units) | Relative intensity |
|---|---|---|
| 55.0549 | 2977 | 0.47 |
| 57.05796 | 3132.2 | 0.49 |
| 60.04513 | 17421.6 | 2.75 |
| 60.05637 | 128141.2 | 20.22 |
| 69.07055 | 85461.4 | 13.48 |
| 70.0658 | 330818.8 | 52.19 |
| 71.04989 | 5921.9 | 0.93 |
| 72.045 | 17131.7 | 2.7 |
| 72.08137 | 20841.2 | 3.29 |
| 84.08128 | 4854.7 | 0.77 |
| 86.09691 | 633857.1 | 100 |
| 100.07606 | 11907.7 | 1.88 |
| 112.0873 | 12010.7 | 1.89 |
| 114.09162 | 4669.7 | 0.74 |
| 114.1028 | 3283.5 | 0.52 |
| 116.07072 | 95459.7 | 15.06 |
| 128.10699 | 169818.6 | 26.79 |
| 130.09735 | 35905.3 | 5.66 |

Based on the fragmentation profile, isoleucyl-arginine is the most likely structure of the $C_{12}H_{25}O_3N_5$. However, it cannot be excluded that the other diaminoacids (leucyl-arginine, arginyl-isoleucine, and arginyl-leucine) matches the true identity of the $C_{12}H_{25}O_3N_5$.

The invention claimed is:

1. An in vitro method for detecting avian intestinal dysbiosis, comprising:

a) determining the presence or level of isoleucyl-arginine or isomers thereof in avian sample material, wherein the presence or an increased level of isoleucyl-arginine or isomers thereof in comparison to a non-affected control animal is indicative for avian intestinal dysbiosis, wherein the presence or level of isoleucyl-arginine or isomers thereof are detected or quantified via LC-MS, an enzyme assay, or LC combined with pre- or post-column derivatization and fluorescence or UV detection; and b) administering probiotic agents, prebiotic agents, botanicals, organic/fatty acids, zeolites, bacteriophages or bacteriolytic enzymes or a combination thereof to animals exhibiting the presence of, or an increased level of, isoleucyl-arginine or isomers thereof in comparison to a control animal.

2. The method of claim 1, wherein the avian sample material is, of comprises, avian excremental material.

3. The method of claim 1, wherein the avian sample material is, of comprises, avian feces.

4. The method of claim 1, wherein the avian sample material is, of comprises, pooled avian feces deriving from an avian flock.

5. The method of claim 1, wherein the isoleucyl-arginine or isomers thereof are detected or quantified via LC-MS.

6. The method of claim 1, wherein the isoleucyl-arginine or isomers thereof are detected or quantified via an enzyme assay.

7. The method of claim 1, wherein the isoleucyl-arginine or isomers thereof are detected or quantified via LC combined with pre- or post-column derivatization and fluorescence or UV detection.

8. The method of claim 4, wherein the isoleucyl-arginine or isomers thereof are detected or quantified via LC-MS.

9. The method of claim 4, wherein the isoleucyl-arginine or isomers thereof are detected or quantified via an enzyme assay.

10. The method of claim 4, wherein the isoleucyl-arginine or isomers thereof are detected or quantified via LC combined with pre- or post-column derivatization and fluorescence or UV detection.

11. The method of claim 1, wherein, in step b), said animal exhibiting the presence of, or an increased level of, isoleucyl-arginine or isomers thereof is administered a probiotic agent in its feed or water.

12. The method of claim 1, wherein, in step b), said animal exhibiting the presence of, or an increased level of, isoleucyl-arginine or isomers thereof is administered a prebiotic in its feed or water.

13. The method of claim 1, wherein, in step b), said animal exhibiting the presence of, or an increased level of, isoleucyl-arginine or isomers thereof is administered a botanical in its feed or water.

14. The method of claim 1, wherein, in step b), said animal exhibiting the presence of, or an increased level of, isoleucyl-arginine or isomers thereof is administered organic acid in its feed or water.

15. The method of claim 1, wherein, in step b), said animal exhibiting the presence of, or an increased level of, isoleucyl-arginine or isomers thereof is treated by administering a fatty acid to the animal in its feed or water.

16. The method of claim 1, wherein, in step b), said animal exhibiting the presence of, or an increased level of, isoleucyl-arginine or isomers thereof is administered a zeolite in its feed or water.

17. The method of claim 1, wherein, in step b), said animal exhibiting the presence of, or an increased level of, isoleucyl-arginine or isomers thereof is administered a bacteriophage or a bacteriolytic enzyme in its feed or water.

* * * * *